(12) United States Patent
Flynn

(10) Patent No.: US 8,033,475 B2
(45) Date of Patent: Oct. 11, 2011

(54) METHOD AND SYSTEM FOR PROVIDING A NOTEBOOK STORED VALUE TOKEN

(75) Inventor: Nichole Flynn, Park Ridge, IL (US)

(73) Assignee: Home Depot U.S.A., Inc., Atlanta, GA (US)

( * ) Notice: Subject to any disclaimer, the term of this patent is extended or adjusted under 35 U.S.C. 154(b) by 90 days.

(21) Appl. No.: 12/554,382

(22) Filed: Sep. 4, 2009

(65) Prior Publication Data

US 2011/0057041 A1  Mar. 10, 2011

(51) Int. Cl.
G06K 19/00 (2006.01)
G06K 19/06 (2006.01)
(52) U.S. Cl. .................. 235/492; 235/487; 281/27.1
(58) Field of Classification Search .............. 235/487, 235/492, 379, 380; 281/27.1–27.3, 38; 705/14.1, 705/14.38; 402/79
See application file for complete search history.

(56) References Cited

U.S. PATENT DOCUMENTS

| | | | |
|---|---|---|---|
| 6,146,731 A * | 11/2000 | Tanoto | 428/43 |
| 7,099,038 B2 * | 8/2006 | Schuller | 358/1.18 |
| 7,198,196 B2 | 4/2007 | Halbur et al. | |
| 7,314,178 B2 | 1/2008 | Rines et al. | |
| 7,383,989 B2 | 6/2008 | Lasch et al. | |
| 7,409,788 B2 | 8/2008 | Lauer et al. | |
| 2003/0021624 A1 * | 1/2003 | Dorsey | 402/73 |
| 2003/0218330 A1 * | 11/2003 | Mortimer | 283/81 |
| 2005/0131841 A1 | 6/2005 | Demanowski | |
| 2006/0101678 A1 | 5/2006 | Wilen | |
| 2006/0186196 A1 | 8/2006 | Schultz et al. | |
| 2006/0261154 A1 | 11/2006 | Arthur et al. | |
| 2007/0152066 A1 | 7/2007 | Colby et al. | |
| 2008/0003394 A1 | 1/2008 | Eke | |
| 2008/0114696 A1 | 5/2008 | Singh et al. | |
| 2008/0191878 A1 | 8/2008 | Abraham | |
| 2008/0223939 A1 | 9/2008 | Halbur et al. | |
| 2008/0231038 A1 * | 9/2008 | Canasi et al. | 281/27.1 |
| 2008/0290180 A1 | 11/2008 | Lauer et al. | |

* cited by examiner

Primary Examiner — Michael G Lee
Assistant Examiner — Suezu Ellis
(74) Attorney, Agent, or Firm — Smith Risley Tempel Santos LLC; Michael J. Tempel

(57) ABSTRACT

A method and system provides a stored value token that comprises a notebook with a plurality of sheets fastened together by a binding device. The sheets may have one or more parallel lines for guiding handwritten text. The lines may be formed from ink. The notebook may further comprise a cover and a back. The cover may have human-readable media that identifies the token as a gift card and that may illustrate the type of consumer goods which may be purchased by with the notebook stored value token. The human-readable media can be formed from ink which is placed on a sheet that is attached to the cover by an adhesive. The back of the notebook stored value token can comprise a machine-readable code can that can be applied to a sheet which is attached to the back of the notebook stored value token by an adhesive.

20 Claims, 8 Drawing Sheets

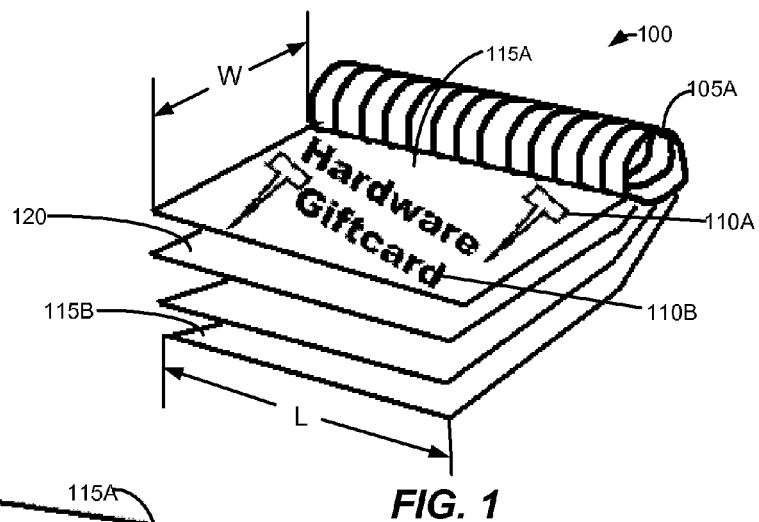
FIG. 1
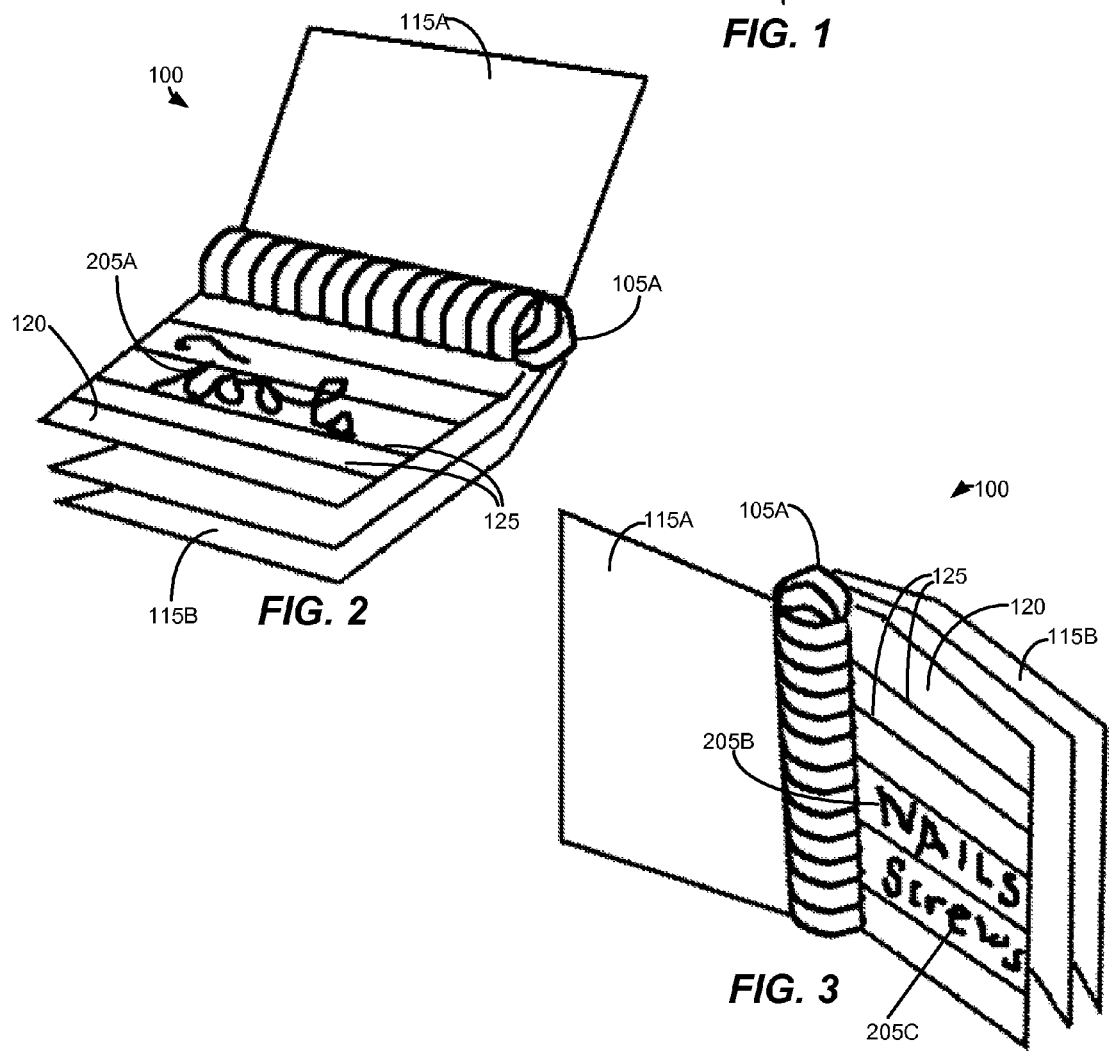
FIG. 2
FIG. 3

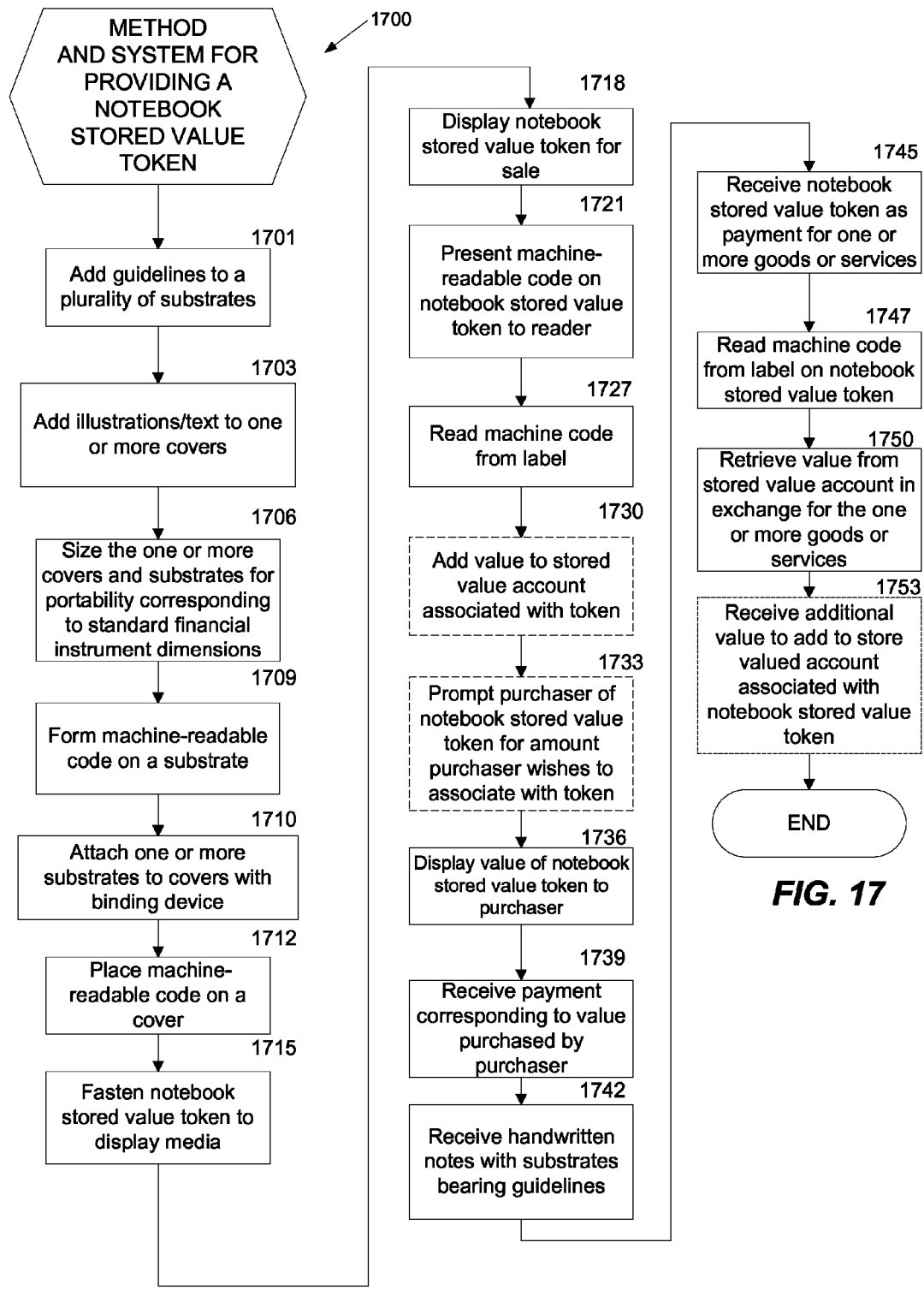

METHOD AND SYSTEM FOR PROVIDING A NOTEBOOK STORED VALUE TOKEN

FIELD OF INVENTION

The invention generally relates to stored value tokens. More particularly, the invention relates to a notebook stored value token.

BACKGROUND

Stored value tokens that include, but are not limited to, gift cards, are often purchased such that the intended recipient of the gift card may use the value associated with the gift card to purchase one or more consumer products. When an intended recipient receives a gift card, the recipient may not have an immediate idea of what consumer product that he or she may want to purchase with the gift card.

On some occasions the intended recipient of a gift card may know immediately what he or she may want to purchase with the gift card. However, later, when the gift card recipient steps inside the store associated with the gift card, the recipient may forget his or her previous idea for use of the gift card.

In other instances, depending upon the value associated with a gift card, the gift card recipient may be able to purchase a plurality of consumer products with the gift card. The gift card recipient may also have one or more household projects that could require several different consumer products. The gift card recipient may write down on a piece of paper separate or detached from the gift card, the plurality of consumer products that may be purchased with the gift card. However, the gift card recipient may forget or misplace the paper containing the list of consumer products that may be purchased with the gift card when he or she attempts to use the gift card.

Accordingly, there is a need in the art for a method and system that allows a recipient of a gift card to accurately track what consumer products the recipient may desire to purchase with the gift card. There is a further need in the art for a method and system that combines a device for receiving writings with a gift card such that the device and gift card are coupled together and cannot be easily separated, unless desired by the user.

SUMMARY OF THE INVENTION

A method and system provides a stored value token that comprises a notebook with a plurality of sheets fastened together by a binding device. The sheets may have one or more parallel lines for guiding handwritten text. The lines may be formed from ink. The notebook may further comprise a cover and a back. The cover may have human-readable media that identifies the token as a gift card and that may illustrate the type of consumer goods which may be purchased by the bearer or owner of the notebook stored value token. The human-readable media can be formed from ink which is placed on a substrate that is attached to the cover by an adhesive. Alternatively, the human-readable media can be applied directly to a surface of the cover or the human readable media can be carved on a surface of the cover. The back of the notebook stored value token can comprise a machine-readable code can that can be applied to a substrate which is attached to the back of the notebook stored value token by an adhesive.

The machine-readable code can take form of at least one of a bar code, a radio-frequency (RF) Identifier, a magnetic stripe, an integrated circuit (IC), or any combination thereof. The machine-readable code can comprise an identifier the corresponds to a stored value account. A purchaser of the stored value token can set the value in the stored value account associated with the stored value token or this value can be set in predetermined increments by the manufacturer. Once purchased by the consumer in which the machine-readable code is scanned by a reader, the stored value token may become activated so that the bearer of the stored value token can use the value in the stored value account to purchase goods or services based on the value in the stored value account. The stored valued token can be replenished for re-use or it can be a one-time use token.

The length and width of the notebook stored value token can be sized such that it corresponds to a standard or traditional card size similar to other money instruments like credit cards, integrated circuit (IC) cards, debit cards, and the like. According to an exemplary embodiment, the binding device may comprise a spiral shaped ring. According to another exemplary embodiment, the binding device may comprise a rectangular shaped enclosure in combination with stitching and an adhesive. According to an another exemplary embodiment, the binding device may comprise one or more metal rings.

According to an exemplary embodiment, the parallel lines for guiding handwritten text on the various sheets within the notebook can be parallel to a longitudinal axis of the binding device. According to another exemplary embodiment, the parallel lines for guiding handwritten text can be perpendicular to the binding device. According to a further exemplary embodiment, the notebook stored value card may comprise a plurality of machine-readable codes that can be positioned on the back as well as a rear side of each sheet within the notebook. In other exemplary embodiments, each side of a planar sheet containing guide lines can have an opposite side that bears human-readable media which may advertise objects which can be purchased with the notebook stored value card.

BRIEF DESCRIPTION OF THE DRAWINGS

FIG. 1 illustrates a perspective view of a notebook stored value token according to an exemplary embodiment of the invention.

FIG. 2 illustrates another perspective view of the notebook stored value token of FIG. 1 with a cover to the notebook in a raised position exposing guidelines on planar sheets that are parallel to a binding according to an exemplary embodiment of the invention.

FIG. 3 illustrates a notebook stored value token with a cover to the notebook in a raised position exposing guidelines on planar sheets that are perpendicular to a binding according to an exemplary embodiment of the invention.

FIG. 17 is a logic flow diagram highlighting various steps of a method for making and using the notebook stored value token according to an exemplary embodiment of the invention.

DETAILED DESCRIPTION OF EXEMPLARY EMBODIMENTS

Figure 4:
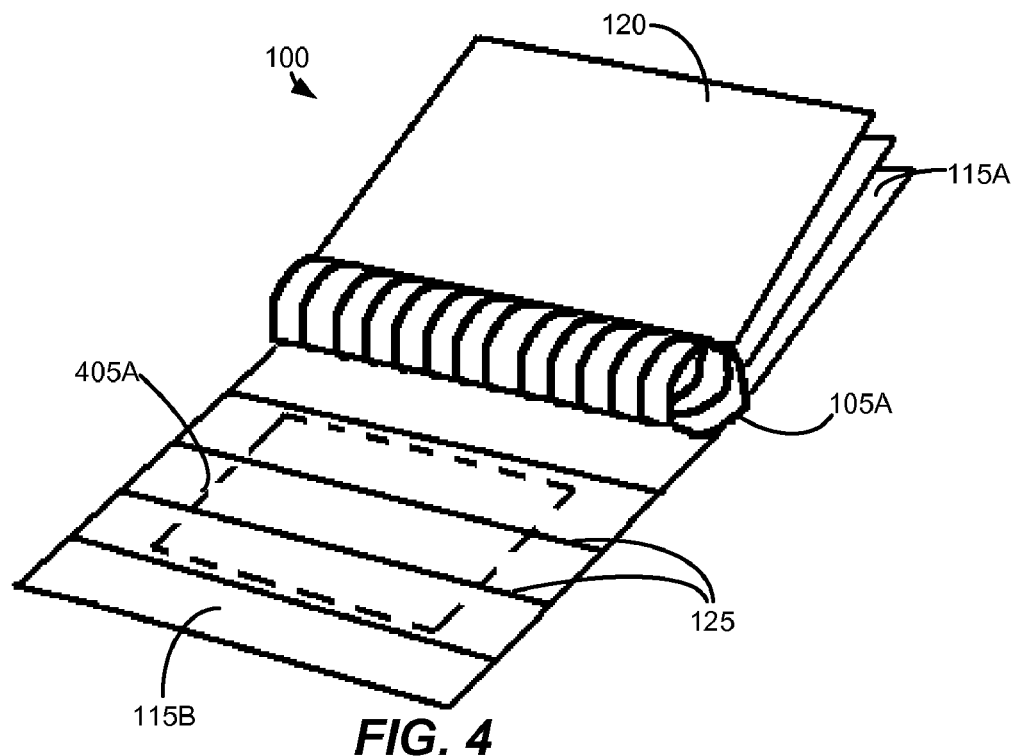
FIG. 4 illustrates a notebook stored value token with all of the planar sheets in a raised position exposing guidelines on a cover that are parallel to the binding and also showing a machine-readable code with dashed lines according to an exemplary embodiment of the invention.

Referring now to FIG. 1, in which like reference numerals designate like elements, this figure illustrates a perspective view of a notebook stored value token 100 according to an exemplary embodiment of the invention. The notebook stored value token 100 can comprise a first cover 115A and a second cover 115B with one or more planar sheets 120 of material disposed between the two covers 115. The planar sheets 120 of material can comprise any type of paper which can easily support writings based in ink, pencil, or other writing materials. Other materials for the planar sheets 120 beyond paper which can receive writings are within the scope of the invention.

The first cover 115A and second cover 115B can comprise cardboard or a material similar to that of the material forming the planar sheets 120, but with an increased thickness relative to the planar sheets 120. In this way, the planar sheets 120 can be protected by the first and second covers 115. However, it is possible to form covers 115 out of the same material and thickness as the planar sheets 120.

The covers 115 and planar sheets 120 can have a length L and a width W that generally correspond with the length and width of cards used in financial transactions. In other words, the length L and width W can be selected to correspond with standard sized financial cards like debit cards, integrated circuit (IC) cards, and credit cards as used in industry. The length L and width W can correspond with Format ID-1 of the International Organization for Standardization (ISO) and the International Electrotechnical Commission (ISO/IEC) standard 7810. This means that the length L can comprise a magnitude of about eighty-five millimeters and the width W can comprise a magnitude of about fifty-four millimeters. Dimensions greater than or less than these exemplary magnitudes are within the scope of the invention.

The covers 115 and planar sheets 120 are coupled together by a binding device 105A. The binding device 105A illustrated in FIG. 1 comprises a spiral ring. This means that the covers 115 as well as the planar sheets 120 may comprise holes (not illustrated) which receive various parts of the spiral ring binding device 105A. The spiral ring binding device 105A may be made from metal, plastics, composites, and other similar materials. Other binding devices 105 are within the scope of the invention as will be described below in connection with FIGS. 11 and 12.

The first cover 115A may comprise human-readable media 110A, 110B. The first human-readable media 110A may identify a type of consumer goods that may be purchased with the notebook stored value token 100. In the exemplary embodiment illustrated in FIG. 1, the first human-readable media 110A comprises an illustration of a nail. Other consumer goods, beyond nails, are within the scope of the invention.

The second human-readable media 110B may identify the invention as a stored value token 100. However, other human-readable media 110 beyond those described for the first cover 115A are within the scope of the invention. The human-readable media 110 may be formed from ink or other marking media. The human-readable media 110 can be applied directly to the first cover 115A or it may be applied to a substrate (not shown in FIG. 1 but see FIG. 10) that is attached to the first cover 115A. The human-readable media 110 can also be carved out from a surface of the first cover 115A.

FIG. 2 illustrates another perspective view of the notebook stored value token 100 of FIG. 1 with the first cover 115A to the notebook in a raised position exposing guidelines 125 on planar sheets 120 that are parallel to the binding device 105A according to an exemplary embodiment of the invention. The guidelines 125 can help support writings 205A that are received. The writings 205A can be generated with ink (or other marking material) by hand writing instruments or mechanical devices like a printer or typewriter. The guidelines 125 can provide a reference frame for hand written notes so that the notes can be properly aligned for improved penmanship. The guidelines 125 can be formed from ink (or other writing material) or they can be engraved into the planar sheets 120.

FIG. 3 illustrates a notebook stored value token 100 with the first cover 115A to the notebook in a raised position exposing guidelines 125 on planar sheets 120 that are perpendicular to the binding device 105A according to an exemplary embodiment of the invention. In this exemplary embodiment, the guidelines 125 are perpendicular to the binding device 105A so that writings 205B, 205C can be received which are also perpendicular to the binding device 105A.

Figure 13:
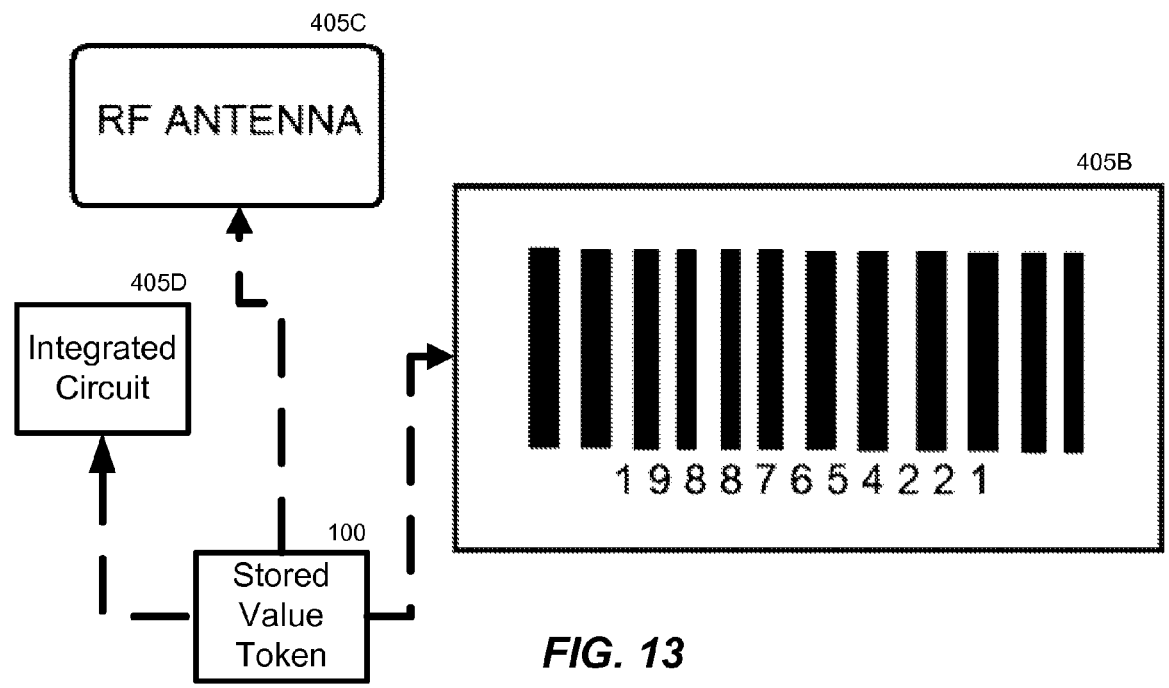
FIG. 13 illustrates various exemplary embodiments of the machine readable code for the stored value token according to the invention.

FIG. 4 illustrates a notebook stored value token 100 with all of the planar sheets 120 in a raised position exposing guidelines on a front inside or first surface of the second cover 115B that are parallel to the binding device 105A and also showing a machine-readable code 405A with dashed lines on an rear outside or second surface of the second cover 115B according to an exemplary embodiment of the invention. The machine-readable code 405A may comprise a bar code, but other types of machine-readable codes as described below in connection with FIG. 13 are within the scope of the invention.

The machine-readable code 405A is shown with dashed lines to indicate that it is positioned on a rear outside or second surface of the second cover 115B relative to the guidelines 125 which are positioned on a front inside or first surface of the second cover 115B. According to an alternative exemplary embodiment, the second cover 115B may not comprise guidelines 125 and it may contain the machine-readable code 405A on either the first, front surface or the second, rear surface of the second cover 115B.

Figure 5:
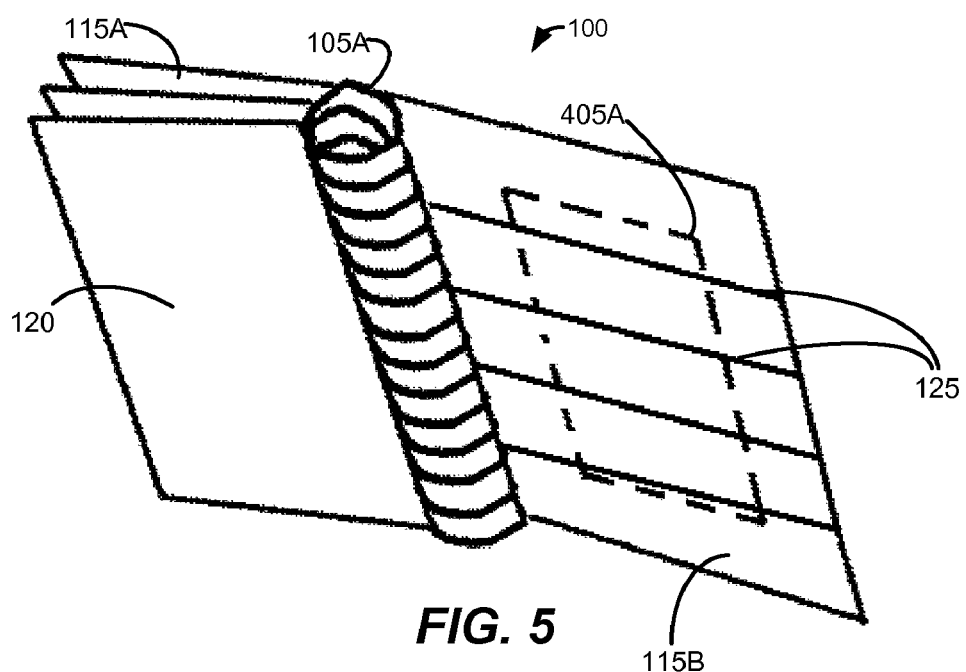
FIG. 5 illustrates a notebook stored value token with all of the planar sheets in a raised position exposing guidelines on a cover that are perpendicular to the binding and also showing a machine-readable code with dashed lines according to an exemplary embodiment of the invention.

FIG. 5 illustrates a notebook stored value token 100 with all of the planar sheets 120 in a raised position exposing guidelines 125 on the second cover 115 that are perpendicular to the binding device 105A. In this exemplary embodiment, the machine-readable code 405A is also illustrated with dashed lines to indicate that it is positioned on a second, rear surface of the second cover 115B. According to an alternative exemplary embodiment, the second cover 115B may not comprise guidelines 125 and it may contain the machine-readable code 405A on either the first, front surface or the second, rear surface of the second cover 115B.

Figure 6:
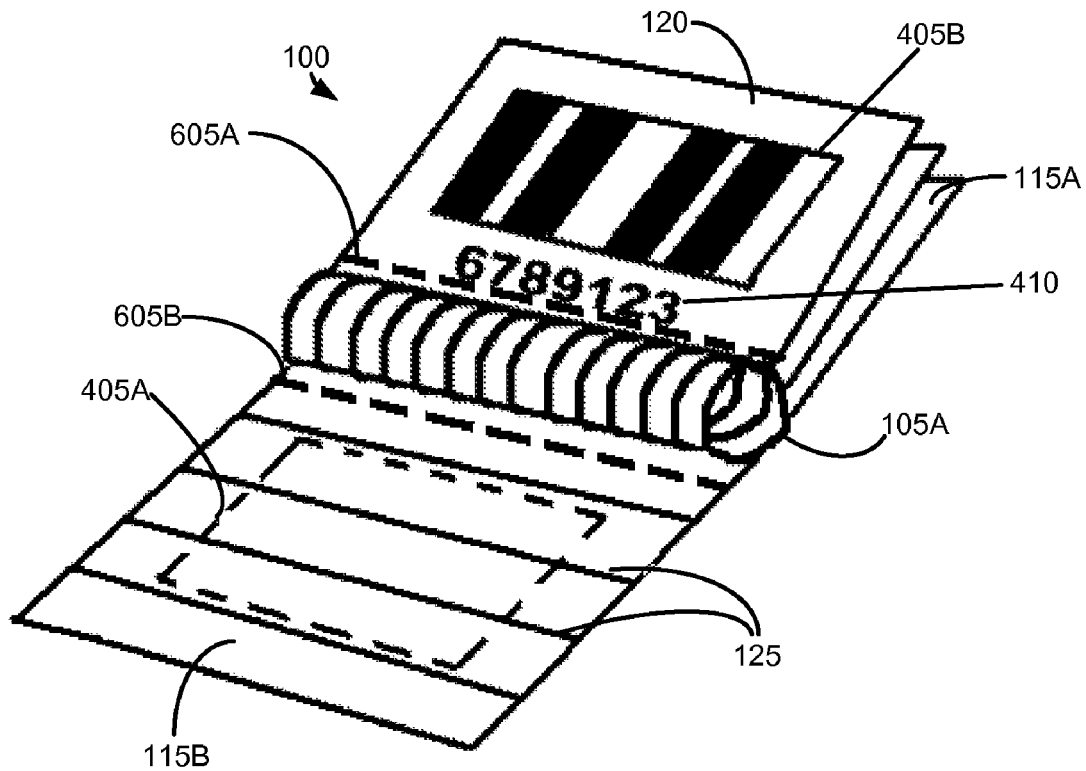
FIG. 6 illustrates a notebook stored value token similar to the one illustrated in FIG. 4, but bearing a machine-readable code on a second surface of each planar sheet opposite to the guidelines provided on each first surface of each planar sheet according to an exemplary embodiment of the invention.

FIG. 6 illustrates a notebook stored value token 100 similar to the one illustrated in FIG. 4, but bearing a machine-readable code 405B on a second surface of each planar sheet 120 opposite to the guidelines 125 provided on each first surface of each planar sheet 120 according to an exemplary embodiment of the invention. This means that each planar sheet or planar sheet 120 may comprise a machine-readable code 405B on a second surface relative to the first surface which may bear the guidelines 125. A human-readable code 410 that is a translation of the machine-readable code 405 may also be present beneath each machine-readable code 405.

In this exemplary embodiment, each planar sheet 120 may further comprise perforations 605A, B that allow each planar sheet 120 to be easily torn or removed from the binding device 105A. Each cover 115 may also comprise a perforation line 605 which facilitates removal of the covers 115 from the binding device 105A. Each perforation line 605 may comprise a series of cuts or an array of linear shaped holes. In this way, the planar sheets 120 and covers 115 may be removed from the binding device 105A so that the machine-readable codes 405 may be scanned or read by a reader or scanner.

Figure 7:
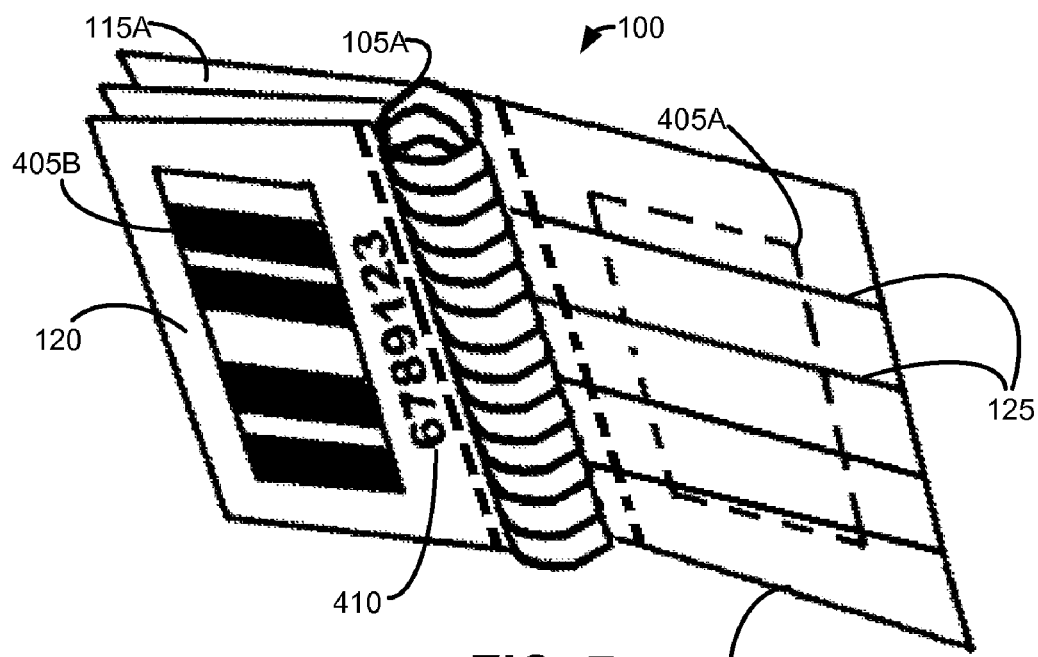
FIG. 7 illustrates a notebook stored value token similar to the one illustrated in FIG. 5, but bearing a machine-readable code on a second surface of each planar sheet opposite to the guidelines provided on each first surface of each planar sheet according to an exemplary embodiment of the invention.

FIG. 7 illustrates a notebook stored value token 100 similar to the one illustrated in FIG. 5, but bearing a machine-readable code 405 on a second surface of each planar sheet 120 opposite to the guidelines 125 provided on each first surface of each planar sheet 120 according to an exemplary embodiment of the invention. This exemplary embodiment is similar to that of the embodiment illustrated in FIG. 6 except that the guidelines 125 are positioned perpendicular to the binding device 105A. This exemplary embodiment also has perforation lines 605 which allow for the easily removal of the covers 115 and planar sheets 120 for scanning/reading of the machine-readable code 405.

Figure 8:
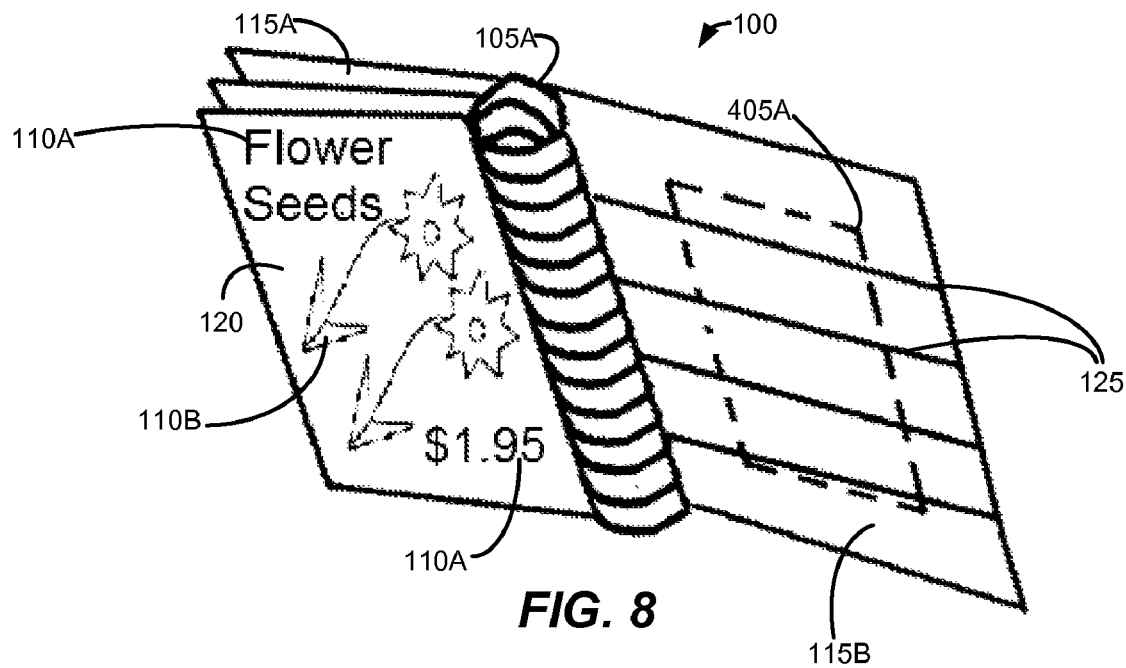
FIG. 8 illustrates a notebook stored value token similar to the one illustrated in FIG. 7, but bearing human-readable media comprising advertising on a second surface of each planar sheet opposite to the guidelines provided on each first surface of each planar sheet according to an exemplary embodiment of the invention.

FIG. 8 illustrates a notebook stored value token 100 similar to the one illustrated in FIG. 7, but bearing human-readable media 110A, 110B comprising advertising on a second surface of each planar sheet 120 opposite to the guidelines 125 provided on each first surface of each planar sheet 120 according to an exemplary embodiment of the invention. According to an alternative exemplary embodiment, the planar sheets 120 can alternate between a machine-readable code 405 on the first surface and human-readable media 110A, 110B on the second surface, similar to how the second cover 115B bears the machine readable code 405 and the planar sheet 120 bears the human-readable media 110A, 110B as illustrated in FIG. 8.

Figure 9:
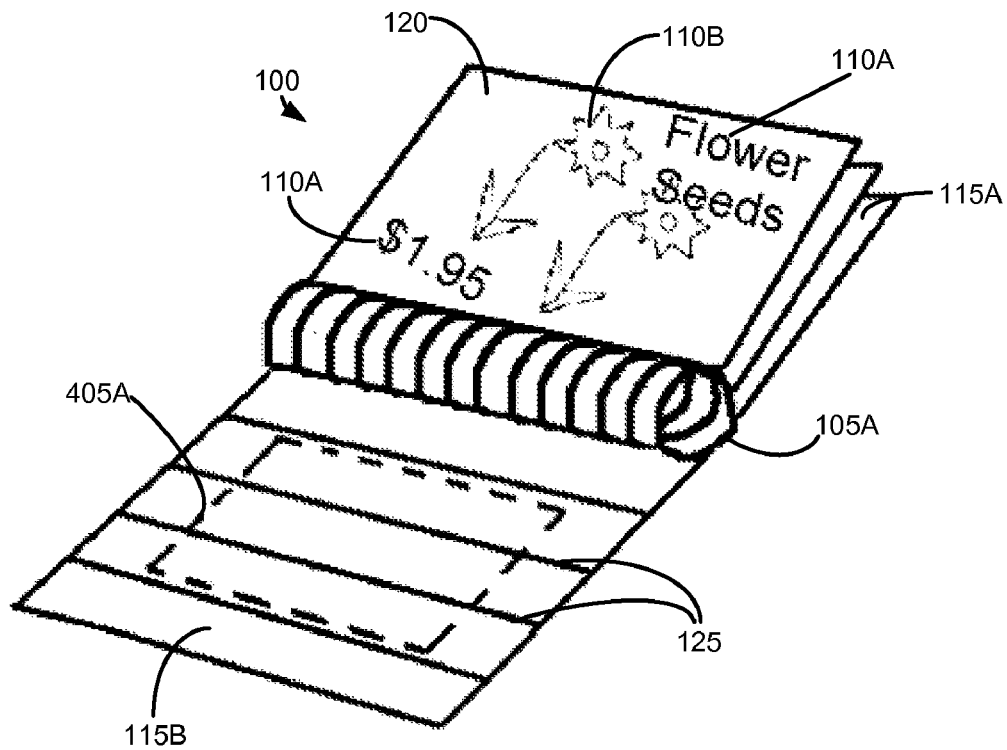
FIG. 9 illustrates a notebook stored value token similar to the one illustrated in FIG. 6, but bearing human-readable media comprising advertising on a second surface of each planar sheet opposite to the guidelines provided on each first surface of each planar sheet according to an exemplary embodiment of the invention.

FIG. 9 illustrates a notebook stored value token 100 similar to the one illustrated in FIG. 6, but bearing human-readable media 110A, 110B comprising advertising on a second surface of each planar sheet 120 opposite to the guidelines 125 provided on each first surface of each planar sheet 120 according to an exemplary embodiment of the invention. This exemplary embodiment is similar to FIG. 8 except that guidelines 125 extend parallel to the binding device 105A. Similar to the embodiments described above in connection with FIG. 8, according to an alternative exemplary embodiment, the planar sheets 120 can alternate between a machine-readable code 405 on the first surface and human-readable media 110A, 110B on the second surface, similar to how the second cover 115B bears the machine readable code 405 and the planar sheet 120 bears the human-readable media 110A, 110B as illustrated in FIG. 9.

Figure 10:
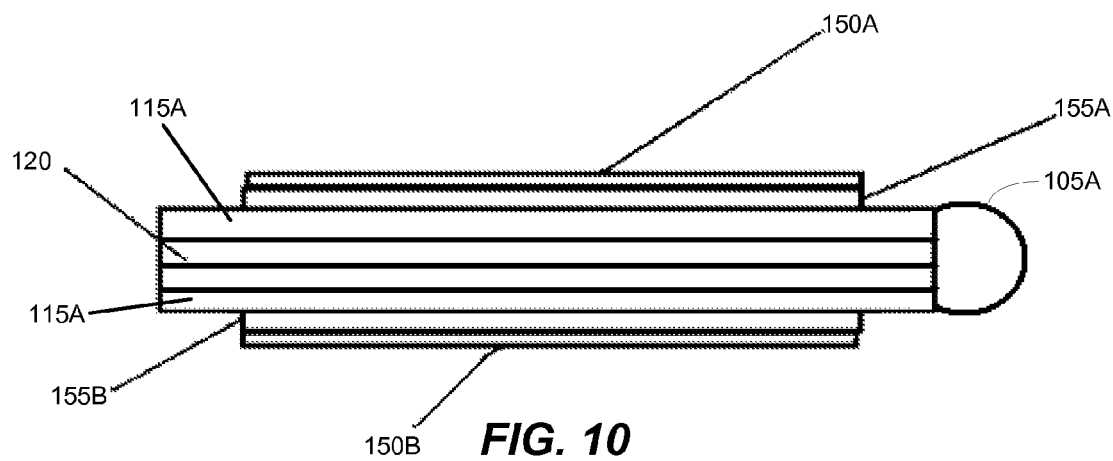
FIG. 10 illustrates a cross-sectional view of the notebook stored value token of FIG. 1 that has a spiral ring binding device according to an exemplary embodiment of the invention.

FIG. 10 illustrates a cross-sectional view of the notebook stored value token 100 of FIG. 1 that has a spiral ring binding device 105A according to an exemplary embodiment of the invention. In this view of the token 100, the thicknesses of the various parts of the token 100 are not drawn to scale so that the various parts can be easily seen. A first substrate 150A that supports the human-readable media 110A, 110B (not shown) is coupled to a surface of the first cover 115A with first adhesive 155A. Similarly, a second substrate 150B supporting the machine-readable code 405 (not shown) is coupled to a surface of the second cover 115B with a second adhesive 155B. The first adhesive 155A and second adhesive 155B can be the same or different types of adhesives.

Figure 11:
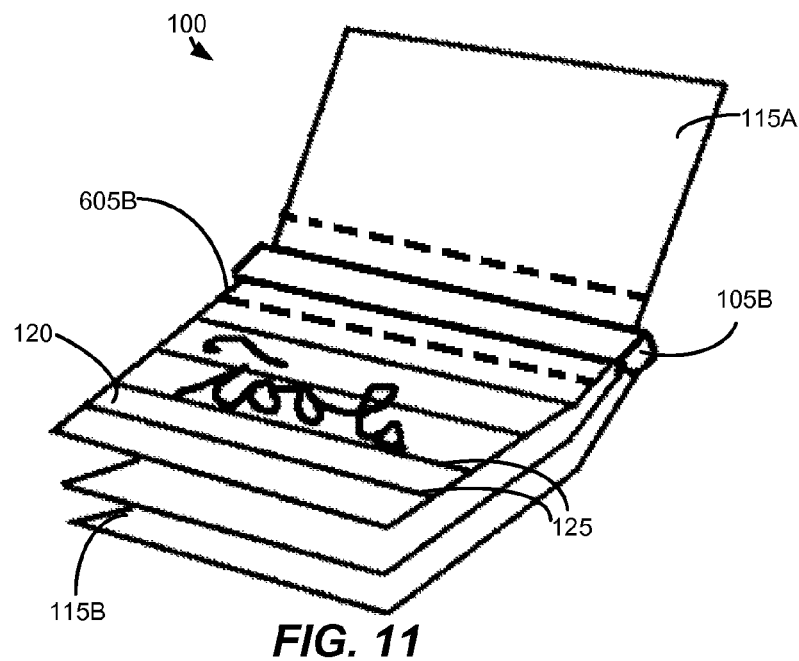
FIG. 11 illustrates a notebook stored value token with an alternative binding device comprising a sewn, adhesive rectangular member according to an exemplary embodiment of the invention.

FIG. 11 illustrates a notebook stored value token 100 with an alternative binding device 105B comprising a sewn thread or an adhesive enclosed within a rectangular member according to an exemplary embodiment of the invention. This alternative binding device 105B can be similar to those used for traditional books in which the pages of a book are sewn and/or glued together and then sealed within the rectangular member which is coupled to the pages by an adhesive. While the binding device 105B is illustrated with an rectangular shape, other shapes such as cylindrical, pentagonal, triangular, and other geometrical shapes are within the scope of the invention.

Figure 12:
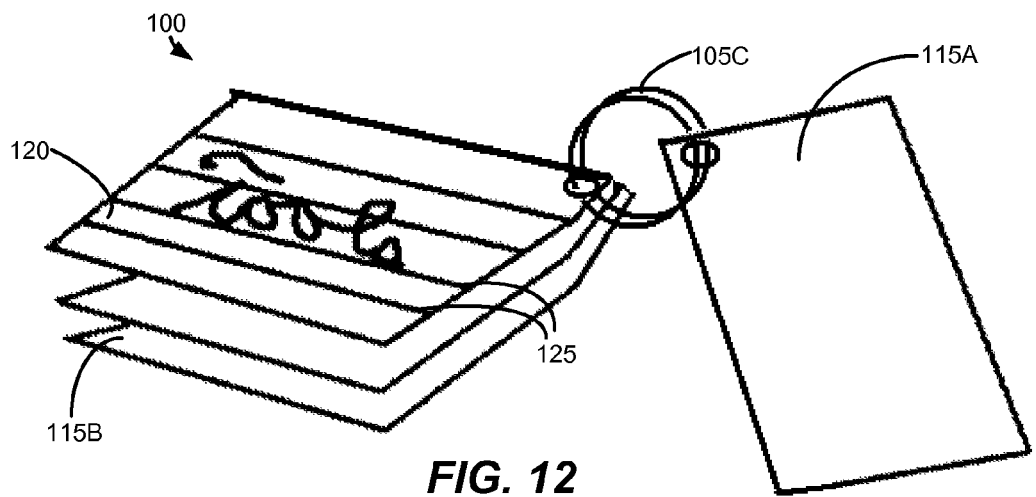
FIG. 12 illustrates a notebook stored value token with another alternative binding device comprising a single ring according to an exemplary embodiment of the invention.

FIG. 12 illustrates a notebook stored value token 100 with another alternative binding device 105C comprising a single ring according to an exemplary embodiment of the invention. The single ring can be made from metal, plastic, composite, and other materials. The single ring binding device 105C can penetrate and couple each of the planar sheets 120 together by passing through a hole in each planar sheet 120 and in each cover 115. The single ring binding device 105C can be made with different shapes, such as, but not limited to, pentagonal, square, triangular, octagonal, and other geometrical shapes.

FIG. 13 illustrates various exemplary embodiments of the machine readable code 405 for the notebook stored value token 100 according to the invention. The machine-readable code 405 can take on one or more different types of forms. For example, the machine-readable code 405B can comprise a bar-code. The machine readable code 405C can comprise an RF antenna coupled to an integrated circuit or chip or the RF antenna can be tuned to a particular unique frequency. Alternatively, the machine-readable code 405D can comprise an integrated circuit (IC) such as an IC circuit for an IC card. The machine-readable code 405 can take the form of any one or any combination of these exemplary codes 405.

Figure 14:
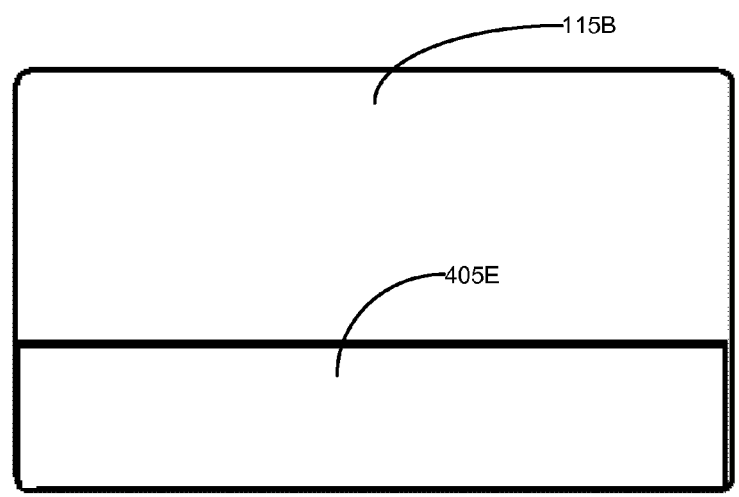
FIG. 14 illustrates a magnetic stripe for the machine readable code according to an exemplary embodiment of the invention.

FIG. 14 illustrates a magnetic stripe for the machine-readable code 405E according to an exemplary embodiment of the invention. The magnetic stripe machine-readable code 405E can be positioned on the second cover 115B (as illustrated), the first cover (115A) not illustrated, as well as on the planar sheets 120 as discussed above.

Figure 15:
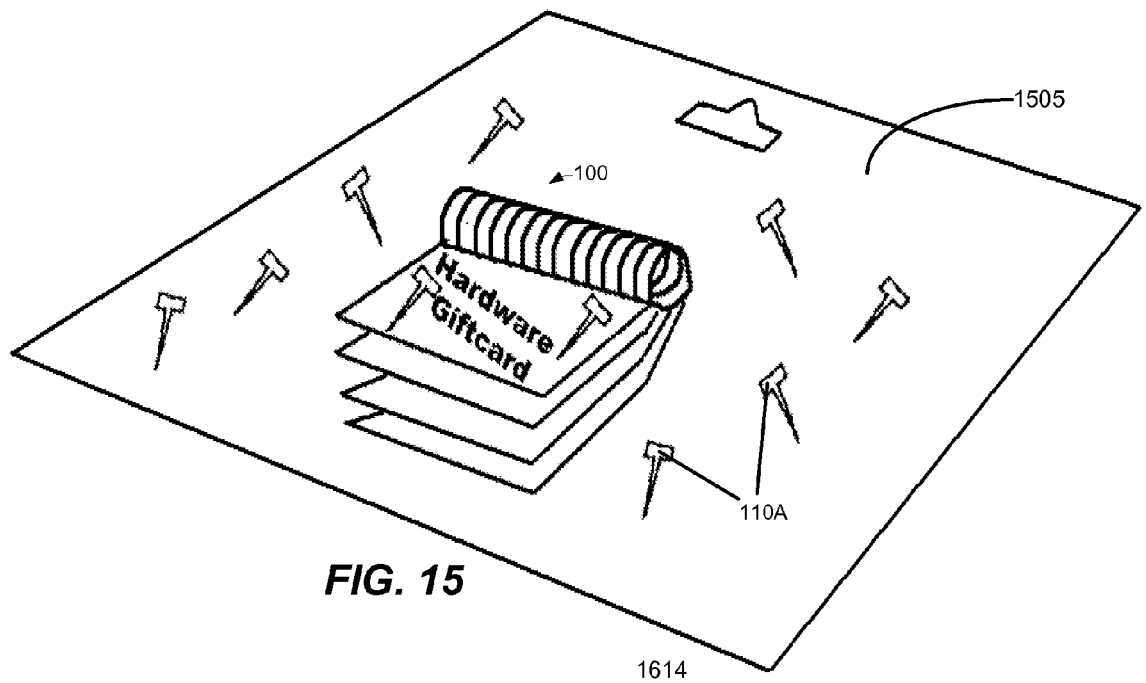
FIG. 15 illustrates a notebook stored value token fastened to display media for retail sale according to an exemplary embodiment of the invention.

FIG. 15 illustrates a notebook stored value token 100 fastened to display media 1505 for retail sale according to an exemplary embodiment of the invention. The display media 1505 can comprise a planar surface made from materials similar to those used for the first and second covers 115. The display media 1505 can further support human-readable media 110A, similar to the human-readable media 110A on the stored value token 100. The notebook stored value token 100 can be fastened to the display media 1505 by an adhesive which does not damage or mar the second cover 115B. After the notebook stored value token 100 is purchased, the stored value token 100 can be removed from display media 1505.

Figure 16:
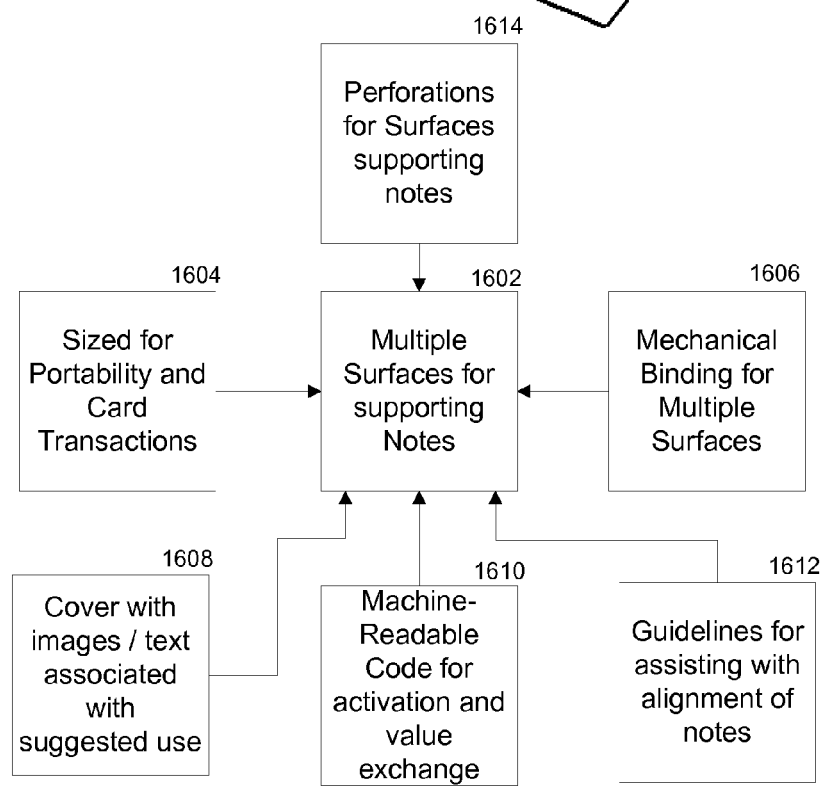
FIG. 16 is a functional block diagram of the notebook stored value token according to an exemplary embodiment of the invention.

FIG. 16 is a functional block diagram of the notebook stored value token 100 according to an exemplary embodiment of the invention. This figure highlights various features of the stored value token 100. One of the main features of the invention includes the multiple surfaces 1602 that support notes from writing instruments. Another feature 1604 includes how the token 100 is sized for portability and for standard card transactions. An additional feature 1614 includes the multiple planar sheets 120 having perforations for easy separation from the binding device 105. An additional feature 1606 is the mechanical binding chosen to bind the planar sheets 120 of the token 100. As described above, the binding device 105 may take on one or more various forms, such as a spiral ring or a traditional book-like binding.

Further features of the token 100 include cover(s) with image(s) and/or text (feature 1608) associated with suggested use of the token 100. The machine-readable code 405 that permits activation and value exchange is also a feature 1610 of the invention. The guidelines 125 which assist with the alignment of notes is a further feature 1612 of the invention.

FIG. 17 is a logic flow diagram highlighting various steps of a method 1700 for using the notebook stored value token 100 according to an exemplary embodiment of the invention. Certain steps in the processes or process flow described in this specification must naturally precede others for the invention to function as described. However, the invention is not limited to the order of the steps described if such order or sequence does not alter the functionality of the invention. That is, it is recognized that some steps may performed before, after, or parallel other steps without departing from the scope and spirit of the invention. In some instances, certain steps can be deleted or not performed without departing from the invention.

Step 1701 is the first step of method 1700 in which guidelines 125 may be added to a plurality of planar sheets 120. The guidelines 125 can be generated from ink or other marking material, or they can be etched or otherwise formed into the planar sheets 120. Next, in step 1703, human-readable media can be added to surfaces of one or more covers 115 for the notebook stored value token 100. The human-readable media 110 can comprise illustrations, text, photographs, etc.

In step 1706, the one or more covers 115 and planar sheets 120 can be sized for portability corresponding to standard financial instrument dimensions. That is, as noted above, the length L and width W of the cover 115 and each planar sheet 120 can be sized according to one or more standards, such as Standard ID-1 of the International Organization for Standardization (ISO) and the International Electrotechnical Commission (ISO/IEC) 7810 standard.

In step 1709, one or more machine readable codes 405 may be formed on a substrate 150A as illustrated in FIG. 10. The machine readable code 405 can comprise a bar code 405B, an RF antenna 405C, an integrated circuit 405D, a magnetic stripe 405E, or any combination thereof. Alternatively, the machine readable code 405 can be applied directly with a writing material, such as ink, to a surface of a cover 115 or a planar sheet 120 or any combination thereof.

Next, in step 1710, the one or more covers 115 and planar sheets 120 are attached together with a binding device 105. The binding device 105 can comprise a spiral ring, a single ring, or a traditional book-like rectangular binding. In step 1712, when the machine readable code 405 is formed on a substrate 150A having one or more adhesive layers 155A, the substrate 150A bearing the machine readable code 405 can be placed on a cover 115.

In step 1715, the notebook stored value token 100 can be fastened to display media 1505 as illustrated in FIG. 15. The token can be fastened to the display media 1505 with an adhesive or by a mechanical device, such as by cut-outs (not illustrated) in the display media 1505 that receive one or more corners of the notebook stored value token 100.

In step 1718, the notebook stored value token 100 can be displayed for sale in a traditional store environment or on-line. If the notebook stored value token 100 is selected for purchase, the machine-readable code 405 is presented to a reader in step 1721. The reader can take on one or many forms. The reader can comprise a point of sale terminal, a kiosk, or other type of device. If the notebook stored value token comprises a plurality of machine-readable codes 405, such as illustrated in FIGS. 6 and 7 described above, each machine-readable code 405 can be presented to the reader or only a single code 405 need to be presented if the plurality of codes 405 are logically related to one another in a back-end database.

In step 1727, the one or more codes 405 can be scanned by the reader. In optional step 1730 illustrated with dashed lines, value in the form of a set or predetermined currency denomination can be added to a stored value account associated with the notebook stored value token 100 which is maintained in a back-end database. For example, the manufacturer of the stored value token 100 may establish that the token 100 can be sold at a value of a set amount such as, for example, twenty U.S. dollars. Once the reader scans the machine-readable code 405, then the selected set value of twenty U.S. dollars can be added to the stored value account associated with the token 100.

Alternatively, in optional step 1733 illustrated with dashed lines, after scanning the machine-readable code 405, the reader may prompt the purchaser of the token to select a desired amount of value to be associated with the token 100. For example, the purchaser of the token 100 could select to associate a value of one-hundred U.S. dollars to the token 100.

Next, in step 1736, the value of the notebook stored value token 100 can be displayed to the purchaser. In this step, the reader may present the value to the purchaser on an electronic display such as a terminal screen or a liquid crystal display (LCD).

In step 1739, payment corresponding to the value of the notebook stored value token 100 can be received. Subsequently, in step 1742, after the intended recipient of the notebook stored value token 100 receives the token 100, handwritten notes 205A from an writing instrument such as a pen or pencil can be received on the planar sheets 120 and within the guidelines 125.

In step 1745, the notebook stored value token 100 can be presented and received as payment in a store for one or more goods and/or services. Next, in step 1747, the machine-readable code 405 can be scanned by a reader. Subsequently, in step 1750, the value from the stored value account associated with the token 100 can be retrieved and exchanged for the one or more goods and/or services being purchased. In optional step 1753, additional value can be received from the purchaser or another person in order to add additional value to the stored value account associated with the notebook stored value token 100. Optional step 1753 allows the notebook stored value token to be re-charged for re-use. The process then ends.

Alternative embodiments for the notebook stored value token 100 will become apparent to one of ordinary skill in the art to which the invention pertains without departing from its spirit and scope. Thus, although this invention has been described in exemplary form with a certain degree of particularity, it should be understood that the present disclosure is made only by way of example and that numerous changes in the details of construction and the combination and arrangement of parts or steps may be resorted to without departing from the scope or spirit of the invention.

What is claimed is:

1. A notebook stored value token comprising:
   a substantially planar and rectangular first cover comprising human-readable media;
   a substantially planar and rectangular planar sheet positioned adjacent to the planar cover and comprising a plurality of guidelines for receiving notes and positioned on a side of the planar sheet;
   a substantially planar and rectangular second cover comprising a machine-readable code associated with a stored value account, the first and second covers having a first thickness, the planar sheet having a second thickness, the first thickness being greater than the second thickness; the first and second covers and planar sheet each having a length and width, the length and width of the first and second covers and the sheet being substantially equal;
   the first and second covers and planar sheet being coupled together with a binding device, the binding device comprising a spiral ring.

2. The notebook stored value token of claim 1, wherein the human readable media comprises one of text and illustrations that suggest products which can be purchased with the notebook stored value token by debiting the stored value account.

3. The notebook stored value token of claim 1, further comprising a plurality of substantially planar and rectangular planar sheets positioned between the first and second covers.

4. The notebook stored value token of claim 3, wherein each sheet has human-readable media positioned on a surface opposite to the surface having the guidelines.

5. The notebook stored value token of claim 3, wherein each sheet has a machine-readable code positioned on a surface opposite to the surface having the guidelines.

6. The notebook stored value token of claim 5, wherein the machine-readable code comprises one of a bar code, integrated circuit, a radio-frequency antenna, and a magnetic stripe.

7. The notebook stored value token of claim 3, wherein each sheet comprises perforations for facilitating separation of the sheet from the binding device.

8. The notebook stored value token of claim 1, wherein the machine-readable code comprises one of a bar code, integrated circuit, a radio-frequency antenna, and a magnetic stripe.

9. The notebook stored value token of claim 1, wherein the binding device defines a longitudinal axis, the guidelines on the sheet being parallel with the longitudinal axis.

10. The notebook stored value token of claim 1, wherein the binding device defines a longitudinal axis, the guidelines on the sheet being perpendicular to the longitudinal axis.

11. The notebook stored value token of claim 1, wherein the sheet comprises perforations for facilitating separation of the sheet from the binding device.

12. The notebook stored value token of claim 1, wherein the machine-readable code is formed on a label comprising an adhesive which couples the label to the second cover.

13. The notebook stored value token of claim 1, wherein the human-readable media is formed on a label comprising an adhesive which couples the label to the first cover.

14. A stored value token comprising:
   a substantially planar and rectangular first cover comprising human-readable media, the human readable media comprises one of text and illustrations that suggest one or more products which can be purchased with the stored value token by debiting a stored value account;
   a plurality of substantially planar and rectangular planar sheets positioned adjacent to the planar cover and comprising a plurality of guidelines for receiving notes and positioned on a surface of each planar sheet of the plurality of substantially planar and rectangular planar sheets;
   a substantially planar and rectangular second cover comprising a machine-readable code associated with the stored value account, the machine-readable code is formed on a label comprising an adhesive which couples the label to the second cover, the machine-readable code comprising a bar code; the first and second covers having a first thickness, each planar sheet having a second thickness, the first thickness being greater than the second thickness; the first and second covers and planar sheets each having a length and width, the length and width of the first and second covers being substantially equal to the length and width of each planar sheet; and
   the first and second covers and each planar sheet being coupled together with a binding device.

15. The stored value token of claim 14, wherein the binding device comprises one of a spiral ring, a single ring, and a rectangular binding with an adhesive.

16. The stored value token of claim 14, wherein each sheet comprises perforations for facilitating separation of a respective sheet from the binding device.

17. The stored value token of claim 14, wherein the human-readable media is formed on a label comprising an adhesive which couples the label to the first cover.

18. The stored value token of claim 14, wherein each length comprises a magnitude substantially equal to 85 millimeters and each width comprises a magnitude substantially equal to 54 millimeters.

19. A method for providing a notebook stored value token comprising:
   placing guidelines on a plurality of planar sheets;
   adding human-readable media to one or more covers;
   sizing the one or more covers and planar sheets for portability and corresponding to standard financial card instrument dimensions;
   forming a machine-readable code on a label, the machine-readable code associated with a stored value account;

attaching the one or more covers and planar sheets together with a binding device, the binding device comprising a spiral ring; and placing the machine-readable code on a cover.

20. The method of claim 19, wherein sizing the one or more covers and planar sheets further comprises forming each cover and sheet with a length, width, and thickness, the length and width of each cover and each sheet being substantially equal, a thickness of each cover being substantially greater than a thickness of a sheet.

* * * * *